Figure 1:
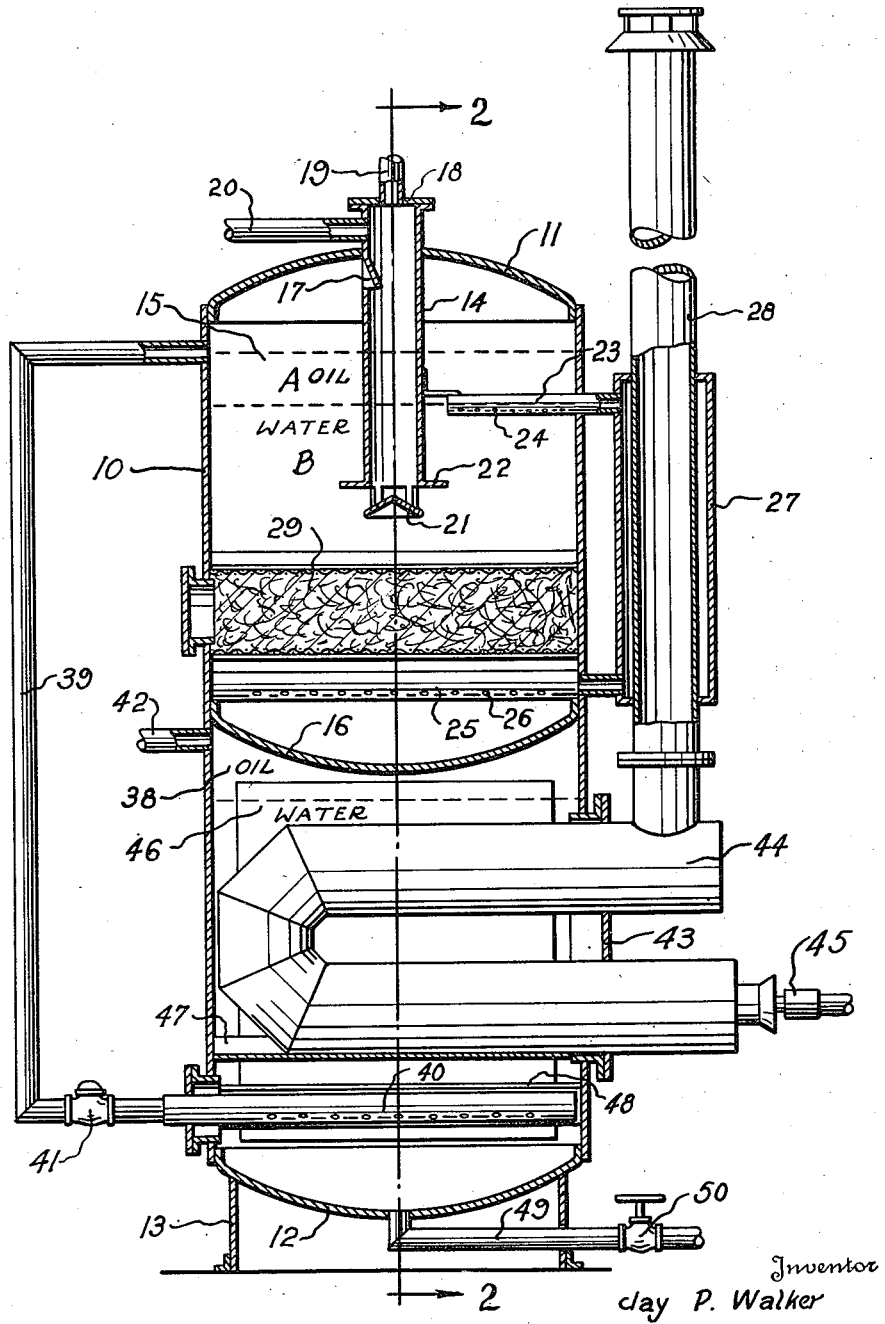

April 9, 1946. J. P. WALKER 2,398,338
COMBINATION HEATER AND WATER KNOCKOUT APPARATUS
FOR TREATING OIL WELL STREAMS
Original Filed Aug. 1, 1940 3 Sheets-Sheet 2

Inventor
Clay P. Walker
By Jack A. Ashley
Attorney

April 9, 1946.   J. P. WALKER   2,398,338
COMBINATION HEATER AND WATER KNOCKOUT APPARATUS
FOR TREATING OIL WELL STREAMS
Original Filed Aug. 1, 1940   3 Sheets-Sheet 3

Inventor
Jay P. Walker
By
Jack Ashley
Attorney

Patented Apr. 9, 1946

UNITED STATES PATENT OFFICE 2,398,338

COMBINATION HEATER AND WATER KNOCKOUT APPARATUS FOR TREATING OIL WELL STREAMS

Jay P. Walker, Tulsa, Okla., assignor of forty per cent to Guy O. Marchant and six per cent to C. G. Wells, both of Tulsa, Okla.

Continuation of application Serial No. 349,382, August 1, 1940. This application October 16, 1942, Serial No. 462,300

11 Claims. (Cl. 210—49.5)

This invention relates to new and useful improvements in combination heater and water knockout apparatuses for treating oil well streams.

One object of the invention is to provide an improved apparatus adapted to be used with settling tanks where such tanks do not have a heater and, owing to changed well conditions, it becomes necessary to add a heater; coupled with the fact that a large and frequently an increased percentage of water will be produced with the oil.

A further object of the invention is to provide an apparatus, as above set forth, wherein free water is removed in advance of the heater so as to materially reduce the load on the heater, as well as on the settling tank, and at the same time assure a treating combination of adequate capacity.

Still another object of the invention is to provide a heater and water knockout combination capable of handling large and increasing volumes of free water, which may be used where a treating plant becomes overloaded and begins to make bad oil.

An important object of the invention is to provide improved apparatus including a settling tank and involving thermo-syphonic circulation, and wherein substantially all of the free water is first extracted and the residual liquids are then heated, or wherein only enough water is heated to heat the emulsion itself; such apparatus being capable of effectually handling large and increasing amounts of free water flowing with the well stream.

Another object of the invention is to utilize the waste heat from the heater to warm accumulated water in the knockout to aid in the removal of free water.

A further object of the invention is to provide an improved system involving a heater and water knockout combination, which may be operated under pressure above atmospheric to prevent the liquids in the system contacting atmosphere during their flow through the system.

A construction designed to carry out the invention will be hereinafter described, together with other features of the invention.

Figure 2:
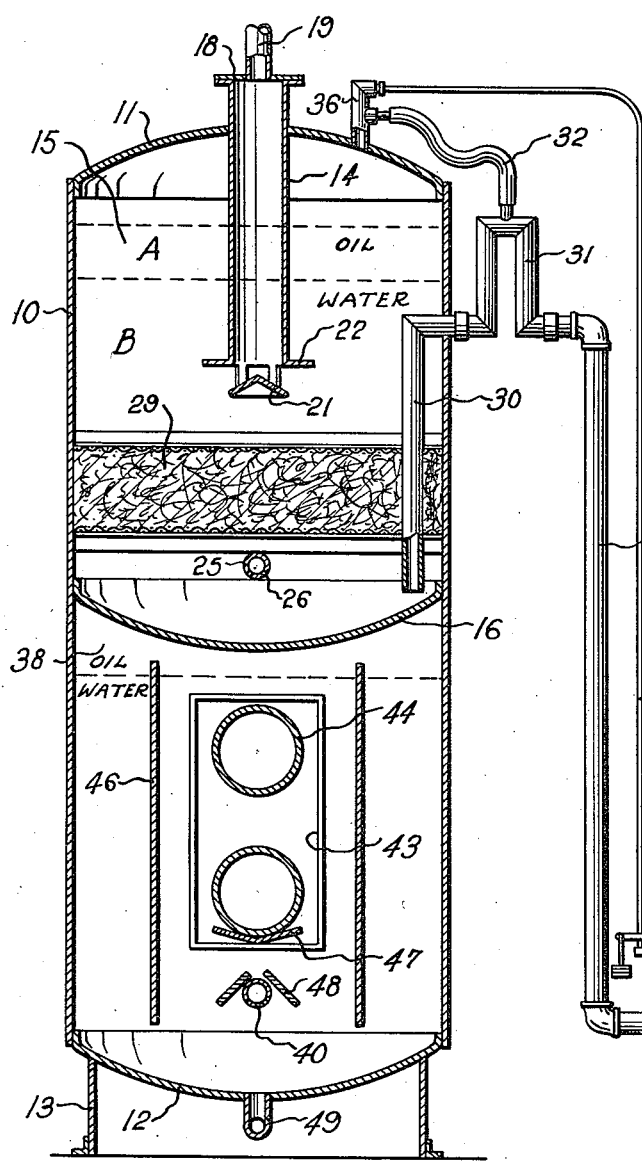
Figure 5:
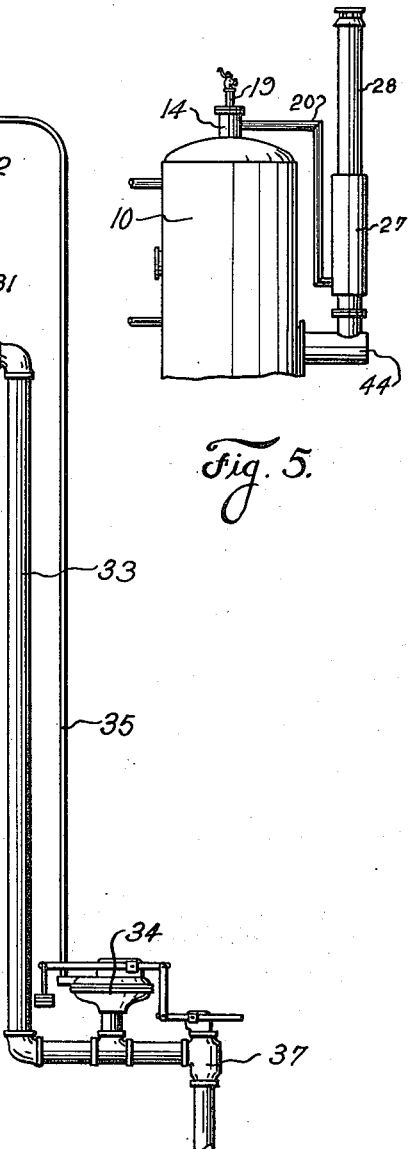
Figure 3:
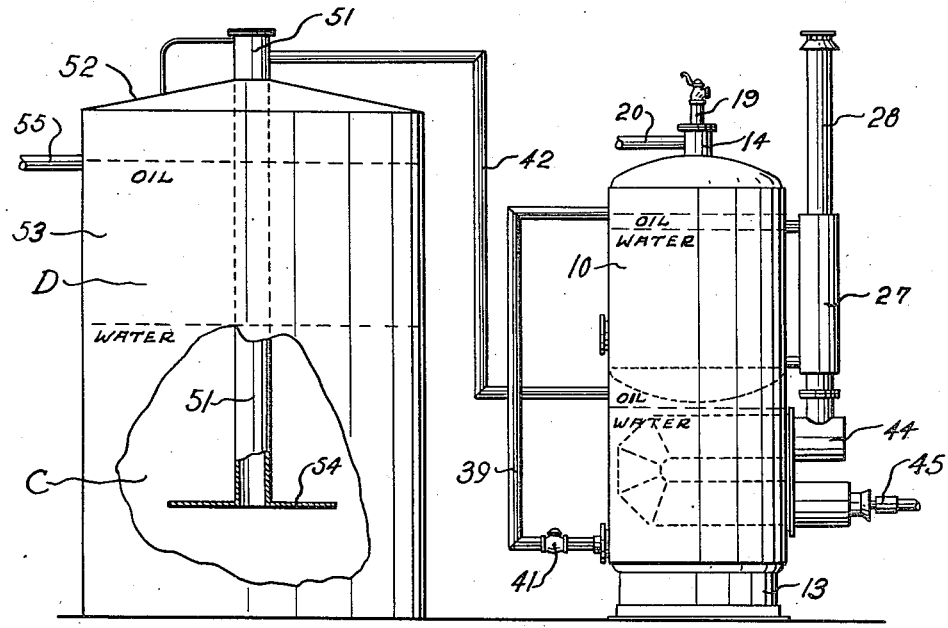
Figure 4:
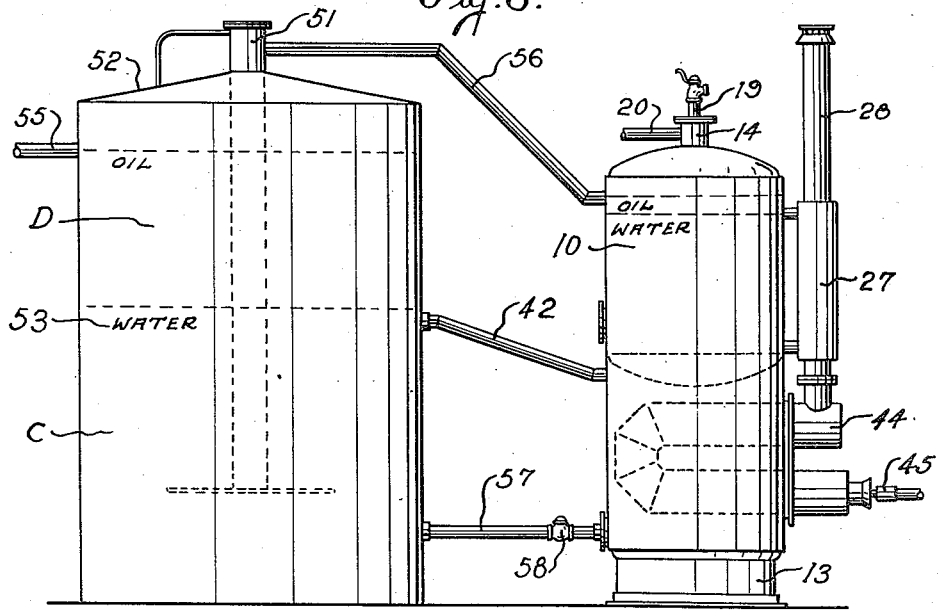

The invention will be more readily understood from a reading of the following specification and by reference to the accompanying drawings, in which an example of the invention is shown, and wherein:

Figure 1 is a transverse, vertical, sectional view of a combined water knockout and heater constructed in accordance with the invention, Figure 2 is a transverse, vertical, sectional view, taken on the line 2—2 of Figure 1, Figure 3 is a view, partly in section and partly in elevation, illustrating a hook-up between the combination water knockout and heater and a settling tank and involving a thermo-syphonic flow, Figure 4 is a similar view of another form of hook-up, and Figure 5 is an elevation of a modified form of the invention.

This application is filed as a continuation of my copending application, Serial No. 349,382, filed August 1, 1940.

In the drawings, the numeral 10 designates an upright tank having a crowned top 11 and a dished bottom 12 supported on an annular base 13. An influent flume 14 (Figures 1 and 2) depends axially through the top 11 into a water knockout container or chamber 15 which is formed in the upper half or section of the tank by a cross partition or head 16, which latter is dished or concave-convex. The container 15 may be a separate structure. The term "water knockout" is common in the oil industry and designates a container wherein free water is separated from the oil or knocked out of the oil.

The flume depends a substantial distance axially down into the chamber 15 and has a hooded gas vent 17 just under the top 11. The upper end of the flume is closed by a cap 18 having a gas outlet pipe 19, while the influent pipe 20 for the well stream enters said flume just below the cap. The gas outlet pipe may include the usual gas pressure regulating valve (not shown). At its lower end the flume has a spreader 21 below an annular deflecting flange 22. The lower end of the flume is immersed in a body of water B, and which may be referred to as a water zone.

An upper water circulating pipe 23 extends horizontally through the side wall of the tank and has its inner end supported by the flume and is provided with apertures 24 to form an upper outlet nozzle. A lower water circulating pipe 25, extending across the bottom of the chamber, has apertures 26 and forms a lower inlet nozzle. The pipes 23 and 25 connect with the upper and lower ends of a water jacket 27 surrounding an upright stack 28. The water in the jacket 27 will be heated by the stack 28, whereby an upward flow in said jacket will be established, causing water to be drawn in through the nozzle 25 and discharged through the nozzle 23. This arrangement sets up a thermo-syphonic circulation. The parts are so arranged and proportioned as to maintain an approximate water level, whereby the body or zone of water is maintained. The influent from the flume discharges well within this body of water, thereby spreading and washing the emulsion mixture. The separated oil collects in a body or zone A and floats upon the body of water.

The arrangement allows the waste heat from the stack 28 to heat the influent within the water knockout chamber, whereby separation of the free water is promoted and enhanced.

The waste heat from the stack adequately heats the influent mixture. The influent may be heated in any desirable manner or the influent may be passed around the stack prior to its introduction into the flume 14 in order to heat said influent, as illustrated in Figure 5. Gas separated from the mixture escapes through the vent 17 into the upper end of the flume and out through the pipe 19. A transverse filter 29 may be mounted in the water zone below the spreader. Substantially all or the major portion of the free water will be extracted in the water knockout chamber and the heating of the water will promote this extraction. The free water which is extracted in the chamber 15 is syphoned therefrom through a pipe 30 extending through the tank wall. An inverted V-tube 31 is hinged to the pipe 30 and to the upper end of a down pipe 33. A vent hose 32 extends from the tube to an elbow 36 in the top 11 of the tank. By swinging the V-tube, the water level in the chamber may be controlled. A diaphragm valve operator 34 is connected in the pipe 33 in advance of a valve 37 and has an equalizing pipe 35 connected with the elbow. This form of water discharge is well known in the art.

Below the partition 16 the tank is formed with a heater chamber 38, which may be a separate container. This portion of the apparatus is referred to as a "heater." A down pipe 39 on the outside of the tank has its upper end connected in the side wall at the oil zone A and its lower end attached to a nozzle 40 extending into and across the bottom of the heater chamber. This pipe maintains an oil level in the chamber 15, whereby the body of oil or oil zone is provided. The pipe includes a reverse flow check valve 41. The chamber has an outlet or discharge pipe 42 at its top just below the partition 16.

A manhole cover 43 is mounted at one side of the heater and carries a V-shaped or return-bend tubular flue or fire tube 44 having a suitable fuel burner 45. The stack 28 rises from the upper leg of the fire tube and the structure may be inserted and removed as a unit. The tube is transversely disposed across the chamber 38 in an upright firebox formed by vertical side plates 46 (Figure 2). These plates terminate short of the upper and lower ends of the heater chamber on each side of the fire tube. A deflector 47 is disposed along the underside of the lower leg of the fire tube. Baffle plates 48 are mounted along each side of the nozzle 40 which has its perforations in its under portion, whereby the numerous streams flowing upwardly will be deflected by said baffles. A drain pipe 49 including a valve 50 leads from the bottom 12.

While free water is extracted or separated from the emulsion mixture in the water knockout chamber 15, the oil collected in the zone A is roily or emulsified, so that the water admixed therewith must be separated therefrom in order to produce clean oil. The oil overflowing from zone A is conducted by pipe 39 and discharged from the nozzle 40 into a body of washing water in the heater chamber 38. This body of water is heated by the tube 44. The oil flows upwardly through the said body of water and is baffled and washed. The washing action is accentuated by the thermo-syphonic circulation setup by the vertical plates 46. The capacity of the chamber 38 and the supply of liquids thereto, is such as to maintain a water level adjacent the upper ends of the plates 46, whereby the clean oil is collected in a body on top of the oil just under the partition 16.

As shown in Figure 3, the oil outlet pipe 42 may be extended and connected with the top of a flume 51 extending axially through the roof 52 of a settling tank 53. The flume extends well down into the water zone C formed by a body of water. The flume has an annular spreader 54 on its lower end, whereby the oil is spread and again washed in the settling chamber. The washing done in the heater may be more or less limited, as the major washing operation is performed in the settling tank, because of its larger size and the preheating carried out in the heater. The washed oil, which collects in a body above the body of water in an oil zone D, is drawn off from the settling tank through a pipe 55.

In Figure 4, another hook-up is shown. Here the roily oil is taken direct from the knockout chamber 15 by way of a pipe 56 to the flume 51. The heater chamber 38 is used strictly as a water heater by connecting the pipe 42 into the settling tank 53 at the top of the water zone C. A return pipe 57 including a back flow check valve 58 extends from the tank at the lower portion of the water zone and connects to the nozzle 40. The hot liquid flowing from the heater by way of the pipe 42 and colder liquid returning through the pipe 57 sets up a thermo-syphonic flow. If desired the plates 46 may be omitted in this form.

It is pointed out that the water knockout chamber, as well as the heater chamber, may be maintained under a pressure above atmospheric, whereby neither the oil or the separated water are contacted by the atmosphere, before settling out in the settling chamber. Also, if desired, the settling tank may be held under a pressure above atmospheric, whereby aeration of the separated water is prevented. Thus, it will be seen that it is within the scope of the present invention to carry out the cycle under pressure above atmospheric.

In setting up the apparatus it is preferable to provide the body of water B in the chamber 15 and the body of water in the chamber 38. The body of water C in the settling tank 53 may be provided or accumulated. Salt water may be used. Of course, after the initial operation the bodies of water, emulsion mixture and oil, remain constant, unless for some purpose the vessels are drained. These apparatuses are usually operated periodically, ceasing to operate when the well or wells are shut down. It would be possible to flow the emulsified oil stream into empty vessels and thereby accumulate the various bodies of liquids, but the apparatus would not reach normal operation until such bodies of liquids were provided.

The foregoing description of the invention is explanatory thereof and various changes in the size, shape and materials, as well as in the details of the illustrated construction, may be made, within the scope of the appended claims, without departing from the spirit of the invention.

What I claim and desire to secure by Letters Patent is:

1. A method of treating oil well emulsion streams which includes, flowing an emulsion oil stream including free water from the well, first discharging the stream into a continuously circulating heated body of water and separating free water by gravitation from the emulsified oil, discharging free water from said body of heated water, restraining the passage of emulsified oil with discharge of said free water collecting emulsified oil from said body of water, conducting the oil into a settling tank having therein a body of water and a body of oil floating on said body of water, washing the conducted oil in said body in said tank, collecting the washed oil in said tank, and discharging the washed oil from the tank.

2. An apparatus for treating oil well emulsions flowing in a stream which includes, a settling tank having a body of water and a body of oil therein, a separating vessel having a body of water therein and means for separating oil and water and also an inlet for a well stream, a heater, means connected with the separating vessel for utilizing the waste heat from the heater to heat the body of water in said separating vessel and to cause a continuous circulation of said water, means for discharging excess water from said body of water in said separating vessel, means for discharging oil from said separating vessel, and means for conducting discharged oil into the body of water in said settling tank.

3. The combination with a settling tank having a body of water and a body of oil therein and an upright conductor extending down through the oil body into the water body, of an emulsion treating tank spaced from the settling tank and having an upper separating chamber and a lower washing chamber, an inlet conductor connected with the separating chamber, a water discharge extending from the lower portion of the separating chamber, an oil conductor leading from the upper portion of the separating chamber to the lower part of the washing chamber of the emulsion treating tank, a heater in the washing chamber, and a conductor leading from the upper part of the washing chamber to the conductor of the settling tank.

4. In an oil well emulsion treating apparatus, the combination of two vessels spaced apart, one of said vessels having an inlet for an emulsified well stream in its upper part and a heater in its lower part for heating the liquids of the well stream together with means for separating and drawing off water separated from the well stream, the other vessel having a body of water and a body of oil floating on the water therein, a conductor carried by said other vessel and extending down through the body of oil and into the body of water therein, means for conducting oil from the first vessel to the conductor of said other vessel, an upper pipe connecting the lower part of the first vessel with the lower part of the second vessel to conduct heated water from the lower part of the first vessel to the lower part of the second vessel, a return pipe connecting the lower portions of the vessels at a lower level than the upper pipe for returning water from the second vessel to the first, whereby a circulation of heated water is maintained between the bodies of water in the lower portions of the vessels, and means for carrying off oil from the second vessel.

5. An apparatus as set forth in claim 4, wherein the first vessel is provided with means for segregating the oil from the circulated water.

6. The method of treating oil well emulsion streams which includes, flowing the emulsion stream from the well, first discharging the stream into a body of heated water and separating free water therefrom by gravitation, separately carrying off separated water, collecting the emulsified oil on said body of water, conducting the emulsified oil to a second body of water and washing it upwardly therethrough, heating the water in such second body and circulating it first out of and then into the path of the upwardly flowing emulsion, collecting the washed oil, conducting the washed oil into a third body of water and conducting it upwardly therethrough to settle out extraneous matter and to further dehydrate the oil.

7. In combination, a combined free water separator and heater unit including a heating element in the heater of the unit, means connected to the heater and positioned so as to utilize the waste heat from said heating element to heat and circulate the emulsified oil introduced into the separator of the unit, means for introducing emulsified oil into the free water separator, a settling tank having a body of water therein, means for conducting oil from the combined free water separator and heater unit to said settling tank, means for conveying the conducted oil down into the body of water in said tank, means for discharging the oil separated from the water in said tank, and means for circulating water from the body of water in the settling tank to the heater.

8. An apparatus of the character described, including a separating chamber having a predetermined body of water therein, said chamber having an inlet for the admission of a stream of emulsified oil and an outlet for excess water accumulated therein, means in said chamber for separating the oil and water in said stream, a settling chamber having a body of water therein, means for introducing oil from the separating chamber into the settling chamber, means for heating the liquid in the settling chamber and having an outlet for the escape of waste heat therefrom, a liquid conduit connected to the separating chamber and disposed in heat exchange relation with the waste heat passage of the heater so as to heat the emulsified oil introduced into the separating chamber, and means for carrying off the accumulated oil from the settling chamber.

9. An apparatus of the character set forth in claim 8, wherein means is provided for causing a circulation of the emulsified oil introduced into the separating chamber.

10. An apparatus of the character set forth in claim 8, wherein means is provided for causing a circulation of the emulsified oil introduced into the settling chamber.

11. A method of treating oil well emulsion streams, which includes heating a body of liquid contained in confined space having an inlet and an outlet, utilizing the waste heat from the said first confined space for heating and circulating a liquid contained in a second confined space having an inlet and an outlet, introducing an emulsified stream of oil into the heated liquid in the second confined space through the inlet of the latter, separating free water from the emulsified oil by gravitation in said second confined space while said emulsified oil is in contact with said heated and circulated liquid, conducting the separated oil from the second confined space into contact with the heated liquid in the first confined space so as to wash said separated oil, and then conducting the separated oil out of the first confined space.

JAY P. WALKER.